United States Patent [19]

Hyodo et al.

[11] Patent Number: 4,995,755
[45] Date of Patent: Feb. 26, 1991

[54] BALL JOINT

[75] Inventors: Youichi Hyodo, Okazaki; Tadao Muramatsu, Toyota; Takaji Hattori, Hamamatsu, all of Japan

[73] Assignee: Toyota Jishoda Kabushiki Kaisha, Toyota, Japan

[21] Appl. No.: 355,969

[22] Filed: May 23, 1989

[30] Foreign Application Priority Data

May 24, 1988 [JP] Japan ................ 63-126684

[51] Int. Cl.⁵ .................. F16C 11/00; F16D 1/12
[52] U.S. Cl. ......................... 403/133; 29/510; 403/131; 403/137; 403/128; 403/280; 384/623
[58] Field of Search ............... 403/133, 137, 135, 131, 403/127, 128, 122, 280; 384/623, 621; 29/149.5 B, 510, 511

[56] References Cited

U.S. PATENT DOCUMENTS

| 1,334,266 | 3/1920 | Simmons | 384/623 |
|---|---|---|---|
| 1,494,392 | 5/1924 | Van Loozen | 384/623 |
| 1,983,947 | 12/1934 | Rockwell | 403/131 X |
| 2,369,991 | 2/1945 | Travilla, Jr. | 403/131 X |
| 2,544,584 | 3/1951 | Booth . | |
| 2,645,510 | 7/1953 | Booth | 403/127 |
| 2,873,130 | 2/1959 | Moskovitz | 403/127 |
| 2,953,401 | 9/1960 | Moskovitz et al. | 403/131 |
| 2,971,770 | 2/1961 | Wagner | 403/131 X |
| 2,998,262 | 8/1961 | Hoffman | 403/131 X |
| 3,007,728 | 11/1961 | Hoffman . | |
| 3,240,509 | 3/1966 | Pierce | 403/127 X |
| 3,363,921 | 1/1968 | Gottschald | 403/131 X |
| 3,389,927 | 6/1968 | Herbenar . | |
| 3,415,551 | 12/1968 | Korecky . | |
| 3,647,249 | 3/1972 | Baba et al. . | |
| 3,677,586 | 7/1972 | Stuck | 29/149.5 B |
| 3,730,369 | 5/1973 | Keene et al. | 403/131 X |
| 3,811,744 | 5/1974 | Wren et al. | 384/623 |
| 3,857,149 | 12/1974 | Hassan | 29/149.51 B |
| 3,950,006 | 4/1976 | Wood, Jr. . | |
| 4,231,673 | 11/1980 | Satoh et al. . | |
| 4,282,770 | 4/1981 | Adams . | |
| 4,318,627 | 3/1982 | Morin | 403/133 |
| 4,353,660 | 10/1982 | Parks . | |
| 4,537,524 | 8/1985 | Hauson | 403/135 X |
| 4,606,668 | 8/1986 | Schmidt | 29/149.5 B |
| 4,648,614 | 3/1987 | Hyodo . | |
| 4,750,885 | 6/1988 | Ito | 403/133 X |
| 4,875,794 | 10/1989 | Kern Jr. | 29/149.5 B |

FOREIGN PATENT DOCUMENTS

| 625421 | 12/1978 | Japan . | |
|---|---|---|---|
| 27085 | 8/1985 | Japan . | |
| 27767 | 2/1986 | Japan . | |
| 0231715 | 4/1925 | United Kingdom | 403/131 |
| 2081369 | 2/1982 | United Kingdom . | |

Primary Examiner—Randolph A. Reese
Assistant Examiner—Carol I. Bordas
Attorney, Agent, or Firm—Thomas R. Morrison

[57] ABSTRACT

A ball joint includes a pair of generally hemispheric head members including facing surfaces. A bearing member is disposed between the facing surfaces. One of the head members is connected to a ball stud, the other includes a shank hole through which the ball stud passes. Both head members are enclosed in a ball seat which is deformed into conformity with a generally spherical outer surface of the combined first and second head members by a socket that is formed about them. An elastic member between the socket and the ball seat applies an axial force to said first and second head members, whereby a substantial preload on the ball joint permits take-up of wear during use.

10 Claims, 3 Drawing Sheets

BALL JOINT

BACKGROUND OF THE INVENTION

1. Field of the Invention

The present invention relates to a ball joint and is particularly directed to a ball joint wherein load is principaly applied in the direction parallel to the shank of the ball stud with the ball stud and the socket rotating relative to each other.

2. Description of the Prior Art

According to conventional ball joints used for a rack and pinion type steering system for automotive vehicles, the main load is applied in the direction parallel to the shank portion of the ball stud, with either the ball stud or the socket rotating. A known example of such type of ball joint is described in Japanese Utility Model Publication No. 27085/1985.

The above conventional ball joint comprises a ball stud provided with a ball bearing around the end of the shank portion thereof to rotatably support a head member which has a spherical outer surface and is contained inside a socket with a ball seat in between. Such conventional ball joint is further characterized by either the shank portion of the ball stud or the socket being connected to the rack bar side of the steering mechanism of an automobile to be moved and rotated in the direction parallel to the rack bar and that the other is connected to the tie rod at the wheel side and interlocked with the said movements in the direction parallel to the rack.

At the time of assembling such a conventional ball joint, preload is applied to the head member with a ball seat made of elastic synthetic resin in order to compensate for abrasion of the contact surface between the ball seat and the head member, but, in this way, the ball bearing does not receive sufficient preload.

In other words, preload such as above is applied to a certain extent to the raceway in which the balls roll, but when the raceway has been worn with abrasion, it will produce play around the ball stud in the direction of its shank center. And wear of the ball stud in the direction of the shank portion center is fatal to the functioning of this type of ball joint. Therefore means to compensate for abrasion is necessary.

SUMMARY OF THE INVENTION

The objective of the present invention is to compensate for abrasion at the bearing section to rotate the ball stud and the socket relative to each other and thereby to provide a ball joint with a long life-span.

A ball joint according to the present invention consists of a ball stud 11 integrally provided at the end of a shank portion 12 thereof with a hemispherical first head member 13 having a flat surface 14 perpendicular to the said shank portion 12; a nearly hemispherical second head member 15 rotatably fitted around the shank portion 12 of the said ball stud 11 and having a flat surfaces 17 facing the flat surface 14 of the first head member 13; a bearing member 18 provided between the flat surfaces 14 and 17 of the first and second head members 13 and 15 respectively; a socket 23 having at one side thereof an opening 24, from which the shank portion 12 protrudes, and a connected shank portion 26 integrally attached at and projecting from the other side of the socket 23, the socket 23 containing the first and second head members 13 and 15 of the ball stud 11; a ball seat 28 fixed in the socket 23 and enveloping the first and second head members 13 and 15 of the ball stud 11 in a manner that permits them to slide therein; and an elastic member 34 provided at the other end of the inside of the socket 23 in order to apply, through the ball seat 28, a preload on the surfaces opposite thereto of the first and second head members 13 and 15 of the ball stud 11 in the direction that these head members support the bearing member 1 between them.

According to the present invention, while in operation, when, for example, the connected shank portion 26 of the socket 23 rotates and simultaneously advances and retreats in the direction parallel to the shank to move the shank portion 12 of the ball stud 11 in the same direction, the socket 23 rotates, together with the ball seat 28, around the first head member 13, and the second head member 15 supported inside the socket 23 rotates through the bearing member 18 between the second head member 15 and the first head member 13. Therefore, the turning effect is not conveyed to the ball stud 11.

In this manner, preload from the elastic member 34 acts on the bearing member 18 through the ball seat 28 and the first and second head members 13 and 15. Therfore, even though wear occurs to the ball seat 28 and/or the bearing member 18 due to abrasion, such wear is compensated because of preload, which is applied at all times, so no play will occur to the ball stud 11 in the direction of its shank portion.

DETAILED DESCRIPTION OF THE PREFERRED EMBODIMENT

Figure 7:
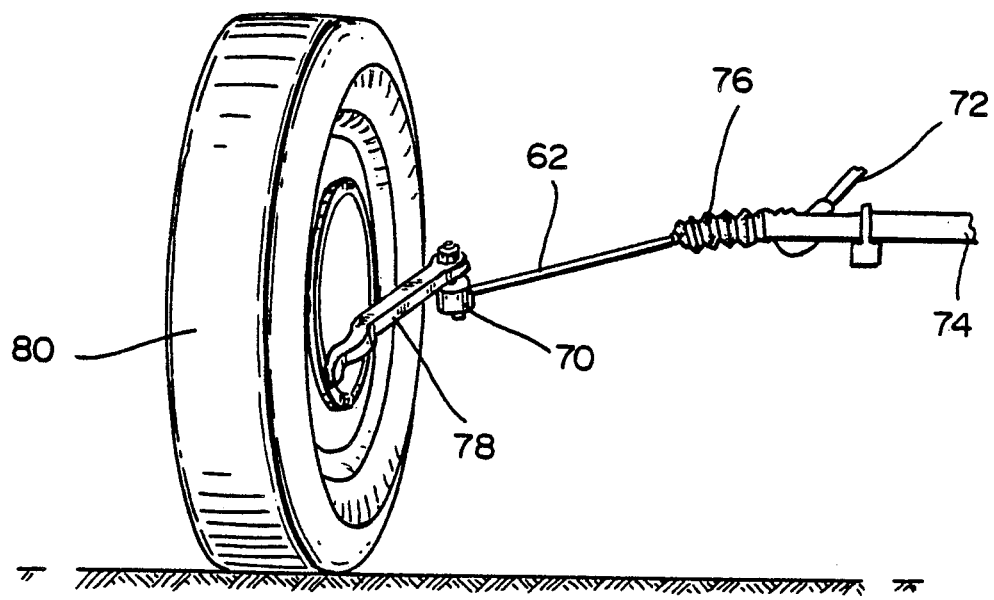
FIG. 7 is a fragmentary elevational view of a vehicle rack and pinion vehicle steering system with which the ball joint of the invention can be used.
Figure 8:
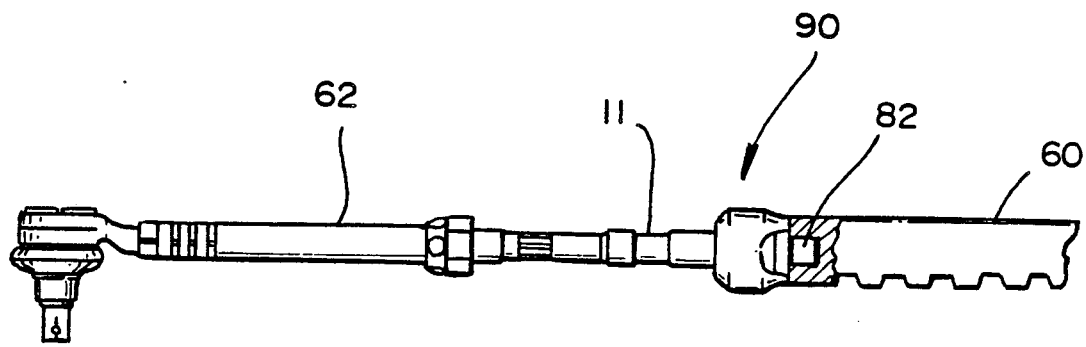
FIG. 8 is a fragmentary elevational view depicting the ball joint connection with the steering system rack on the one side and the tie rod on the other.

The illustrated preferred embodiment of the present invention will be described hereunder referring to the attached drawings;

Referring to FIG. 7, there is show a part of an automobile steering system arrangement with which the ball joint of the invention can be used. The depicted system, representative of only one of a number of such rack and pinion systems as are known, includes a vehicle wheel 80 to which is connected a steering arm 78, which in turn is connected via joint housing 70 to a tie rod 62 as shown in FIG. 8. Tie rod 62 is joined, e.g., slidably or telescopically with ball stud 11, this latter member being part of the ball joint 90 of the invention. In FIG. 7, the ball joint housing is covered by dust boot 76, there also being shown in that Figure, A steering shaft 72 and the tubular housing 74 in which is carried rack and pinion mechanism. As seen in FIG. 8, the ball joint includes a shank portion 82 which is fixed to the rack 60. Thus it is seen the ball joint connects the rack side of the system with the tie rod side in the manner as will be described in greater detail below.

Figure 1:
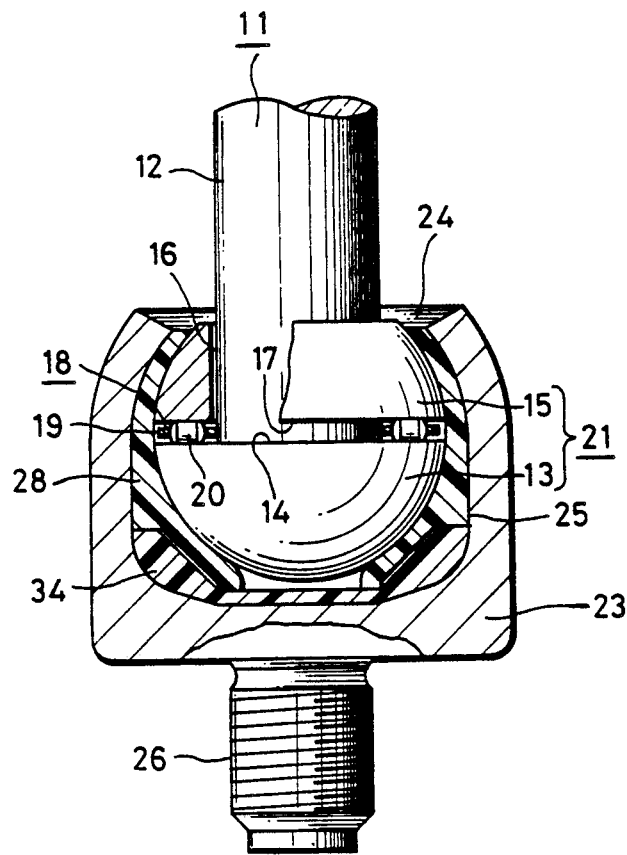
FIG. 1 is a schematic section view according to one embodiment of the present invention.

In FIG. 1, numeral 11 denotes a metal ball stud comprising a cylindrical shank portion 12 and a hemispherical first head member 13 integrally provided at the end of shank portion 12. A flat surface 14 perpendicular to the shank portion 12 is formed around the shank portion 12, at the larger-diameter-end of the first head member 13.

Numeral 15 denotes a second head member made of metal. This second head member 15 is shaped like a ring having a nearly hemispherical outer surface. A shank hole 16 formed at the center of second head member 15 to fit around the shank portion 12. A flat surface 17 is disposed perpendicular to the shank hole 16 and formed at the larger-diameter-end. The second head member 15 is rotatably fitted, at the shank hole 16 thereof, around the shank portion 12. The flat surface 17 of second head member 15 faces the flat surface 14 of the first head member 13.

A bearing member 18 is provided between the flat surfaces 14 and 17 of the first head member 13 and the second head member 15 respectively. The bearing member 18 consists of numerous cylindrical rollers 20 radially arranged and rotatably supported by a ring-shaped cage 19. Each roller 20 is in contact at both sides of the cage 19 with the flat surfaces 14 and 17. In this manner, the said first head member 13 and the second member 15, which together have a globe-like shape, form a spherical head portion 21.

Numeral 23 denotes a metal socket, at one end of which an inner chamber 25 having an opening 24 is formed. A shank portion 26, at the other end of the metal socket 23, is integrally provided to protrude therefrom. The first head member 13 and the second head member 15, which together form the spherical head portion 21 of the ball stud 11, are contained in the inner chamber 25 of the socket 23. The shank portion 12 protrudes from the opening 24. The shank portion 12 of the ball stud 11 and the connected shank portion 26 of the socket 23 are remain aligned with each other.

Figure 2:
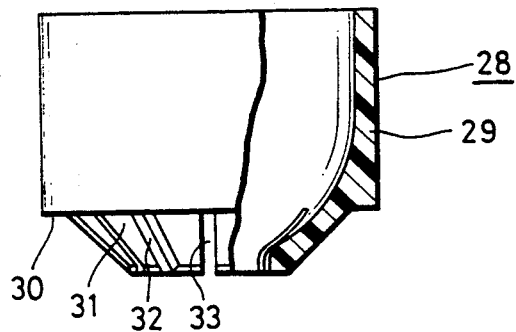
FIG. 2 is a schematic section view of a ball seat before assembly of same.
Figure 3:
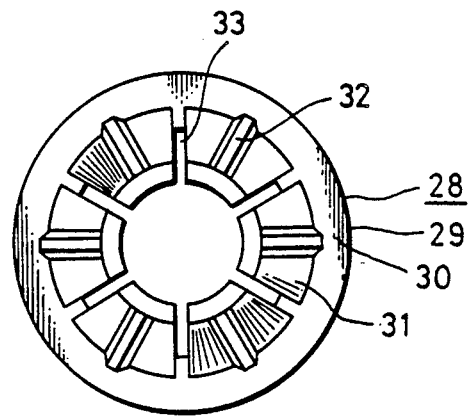
FIG. 3 is a schematic plan of Figure of same.

A ball seat 28 is attached inside the inner chamber 25 of the socket 23 and envelopes the first head member 13 and the second head member 15. A conventional lubricant in the ball seat 28 permits the first head member 13 and the second head member 15 to slide therein. A hard synthetic resin with good load, a resistence and good bearing characteristics, such as, for example, a polyacetal resin, is a suitable material for the ball seat 28. As shown in FIGS. 2 and 3, the ball seat 28, before installation in the socket 23 has a cylindrical portion 29 that is open at one end and include a step portion 30 and a tapered portion 31 of inwardly reducing diameter at the other end. The step portion 30 is located between the cylindrical portion 29 and the tapered portion 30. A plurality of ridges 32 are formed at specified intervals on the outer surface of the tapered portion 31 and in the direction of the shank portion 26. One slit 33 is formed between each two ridges 32, in the direction of the shank portion 26.

An elastic member 34 with a dish-like shape is provided in the socket 23, at the side opposite to the opening 24, i.e. between the bottom of the inner chamber 25 of the socket 23 and the ball seat 28. The elastic member 34 is in contact with the step portion 30 of the ball seat 28 and the outer surface of each ridge 32 of the tapered portion 31. A highly elastic synthetic resin or synthetic rubber, such as, for example, polyurethane or polyester, is a suitable material for the elastic member 34.

The entire side where the opening 24 is provided of the said socket 23 is swaged on, inwardly deformed, at the time of assembly to contain the first head member 13 and the second head member 15 together with the ball seat 28, thereby to envelope the first head member 13 and the second head member 15 and to produce a preload to compensate for abrasion of the ball seat 28. By the deformation of the ball seat 28, the elastic member 34 is simultaneously shrunk so that it receives preload, which produces pressure via the ball seat 28 upon the opposite surfaces of the first and second head members 13 and 15 respectively of the ball stud 11 in the direction to support the bearing member 18 between them.

Then, the connected shank portion 26 of an socket 23 is connected, for example, to a bar side of the operation mechanism of a steering system of an automobile (not shown) and moved and rotated in the direction parallel to the shank portion 26. The shank portion 12 of the ball stud 11 is connected to the tie rod at the wheel side (not shown) and interlocked with the forward and backward movement in a direction parallel to the shank portion 12.

In the above condition, when the connected shank portion 26 of the socket 23 moves in a direction parallel to the shank portion 26, the shank portion 12 of the ball stud 11 moves in the same direction. Simultaneously as the shank potion 26 rotates, the socket 23 and the ball seat 28 also rotate, around the first head member 13. The second head member 15, supported at the socket 23, rotates on the bearing member 18 between the first and the second head members 13 and 15, so that the rotation of the shank portion 26 is not conveyed to the ball stud 11.

During the above operation preload from the elastic member 34 works through the ball seat 28, the first head member 13 and through the second head member 15 upon each roller 20 of the bearing member 18.

Therefore, if abrasion of the ball seat 28, the rollers 20 and/or the flat surface 14 and 17 occurs, such abrasion is compensated for by the continually applied preload, and no play occurs around the ball stud 11 in the direction of its shank portion.

Further, by providing the ball seat 28 with a plurality of slits 33, the elastic member 34 works more evenly and smoothly, in applying the preload, thereby achieving a better effect. In addition, a plurality of slits (not shown) can be provided in the direction of the shank portion on the other surface of the ball seat 28, i.e. the surface facing the second head member 15.

Although a bearing member 18 is provided with rollers 20 according to this embodiment, it is also possible to use another type of bearing member, such as various kinds of ball-and-roller bearings and plain bearings in other embodiments of the present invention.

Figure 4:
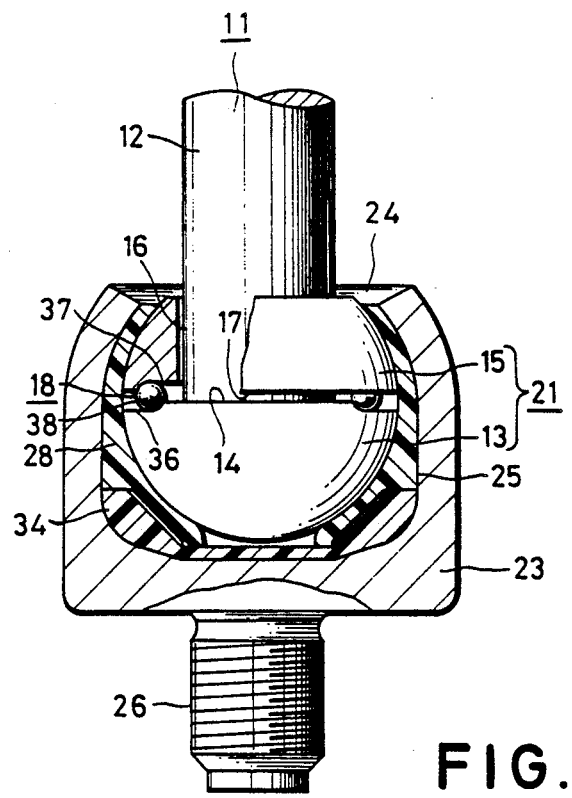
FIGS. 4 through 6 are schematic side views respectively showing other embodiments of the present invention.

For example, the embodiment shown in FIG. 4 calls for forming ring-shaped raceways 36 and 37 along the respective edges of the flat surfaces 14 and 17 of the first and the second head members 13 and 15 of the ball stud 11 and providing numerous balls 38, adjacent to each other, between the raceways 36 and 37.

Figure 5:
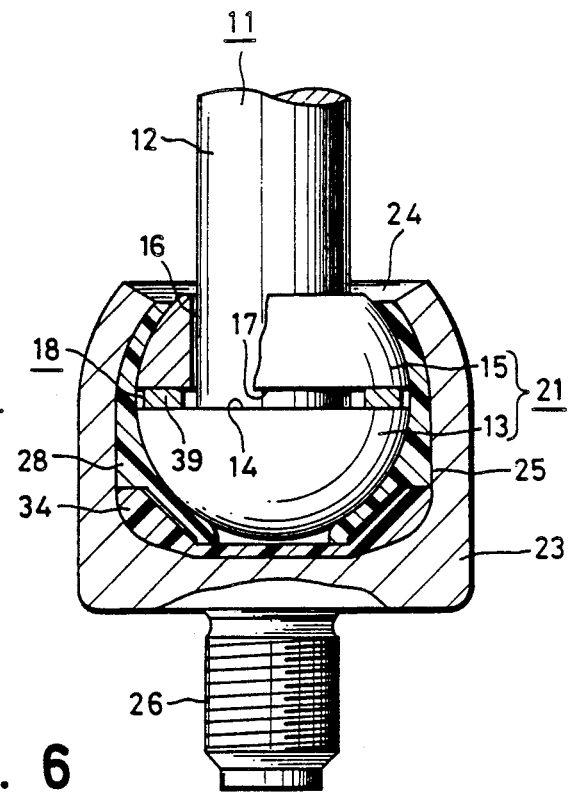

Furthermore, the embodiment shown in FIG. 5 calls for using a ring 39 of a disk-like shape as the bearing member 18. A synthetic resin with a low coefficient of friction, such as a fluororesin, polyacetar, etc., or a metal alloy or composite material with a low coefficent of friction is suitable for use in rings 39.

Figure 6:
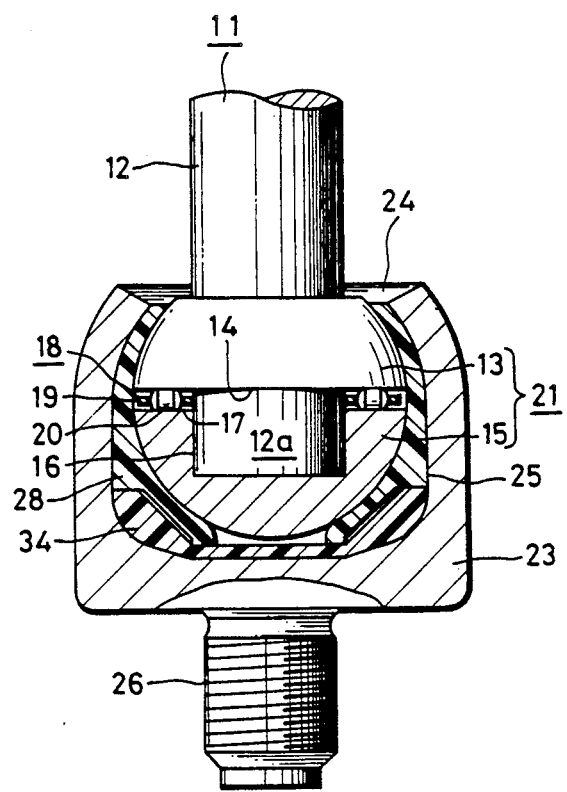

Moreover, according to the embodiment shown in FIG. 6, the first head member 13 and the second head member 15 are arranged at positions opposite to those according to the embodiment shown in FIG. 1. According to the embodiment shown in FIG. 6, the first head member 13 is integrally formed around the shank portion 12 of the ball stud 11, leaving a fitting portion 12a at the end of shank portion 12. The the second head member 15 is rotatably fitted around the fitting portion 12a. In other words, the head can be divided at the surface perpendicular to the shank portion 12 into the first head member 13 and the second head member 15, each member arranged to the each other. Although this embodiment also shows a bearing member 18 consisting of a cage 19 and rollers 20, it is possible to use balls 38 shown in FIG. 4 or rings 39 shown in FIG. 5.

According to the present invention, the ball stud 11 and the socket 23 rotate smoothly in relation with each other due to the bearing member 18 provided between the first and the second head members 13 and 15. Since a preload is applied at all times upon the bearing member 18, abrasion due to load on the ball stud 11 in the direction parallel to the shank portion 26 is compensated for. It is hereby possible to provide a ball joint which is small and at the same time has a large load ratinng as well as high rigidity and a long life-span.

What is claimed is:

1. A ball joint for connecting the rack side of an automotive steering assembly with a tie rod side of said assembly, said ball joint comprising:
    a ball stud said ball stud being connectable to one of said assembly rack side and tie rod side;
    a first head member;
    said first head member including a first facing surface and a first generally hemispherical surface;
    a second head member including a second facing surface and a second generally hemispherical surface;
    said first and second facing surfaces facing each other and being spaced apart a predetermined distance apart;
    a bearing member disposed in said predetermined distance;
    said bearing member including means for permitting relative rotation between said first and second facing surfaces;
    a ball seat enclosing said first and second head members;
    a socket enclosing said ball seat;
    a shank portion connected to said socket and extending generally coaxially with said ball stud, said shank portion being connectable to the other of said assembly rack side and tie rod side;
    said first and second generally hemispherical surfaces together forming a generally spherical surface;
    said socket including means for resiliently conformably enveloping said ball seat to a substantial portion of said generally spherical surface, whereby a substantial preload is applied to said first and second head members;
    said ball stud being affixed to one of said first and second head members;
    the other of said first and second head members including a shank hole for accommodating passage of said ball stud therethrough, thereby permitting relative rotation therebetween and;
    an elastic member between said socket and said ball seat;
    said elastic member being effective for applying a preload in a direction urging said first and second facing surfaces toward each other to compensate for wear in said ball joint.

2. A ball joint according to claim 1, wherein said bearing member includes cylindrical rollers.

3. A ball joint according to claim 2, wherein a cage is disposed about said cylindrical rollers.

4. A ball joint according to claim 1, wherein said bearing member includes a plurality of balls.

5. A ball joint according to claim 4, wherein said bearing member further includes at least one raceway into which said plurality of balls are rollably disposed.

6. A ball joint according to claim 1, wherein said bearing member includes a ring disposed between said first and second facing surfaces.

7. A ball joint according to claim 1, wherein:
    said ball seat includes a plurality of ridges on an external surface thereof; and
    at least some of said plurality of ridges contacting said elastic member.

8. A ball joint according to claim 7, wherein said external surface includes at least one slit between an adjacent two of said plurality of ridges.

9. A ball joint according to claim 1, wherein said ball seat includes at least one slit therethrough.

10. A ball joint according to claim 9, wherein said at least one slit faces said elastic member.

* * * * *

UNITED STATES PATENT AND TRADEMARK OFFICE
CERTIFICATE OF CORRECTION

PATENT NO. : 4,995,755

DATED : February 26, 1991

INVENTOR(S) : Youichi Hyodo, et al

It is certified that error appears in the above-identified patent and that said Letters Patent is hereby corrected as shown below:

On the title page item [73] Assignee should read:

Toyota Jidosha, Kabushiki Kaisha, Toyota Japan

Ishikawa Tekko Kabushiki Kaisha, Japan

Signed and Sealed this

First Day of December, 1992

Attest:

DOUGLAS B. COMER

Attesting Officer

Acting Commissioner of Patents and Trademarks